United States Patent
Tracy et al.

(10) Patent No.: US 7,247,955 B2
(45) Date of Patent: Jul. 24, 2007

(54) PWM POWER SUPPLIES USING CONTROLLED FEEDBACK TIMING AND METHODS OF OPERATING SAME

(75) Inventors: John G. Tracy, Raleigh, NC (US); Frederick Tassitino, Jr., Wake Forest, NC (US); Hans Pfitzer, Wake Forest, NC (US); Rennie Bobb, Wake Forest, NC (US); Julius Rice, Raleigh, NC (US)

(73) Assignee: Eaton Power Quality Corporation, Cleveland, OH (US)

( * ) Notice: Subject to any disclaimer, the term of this patent is extended or adjusted under 35 U.S.C. 154(b) by 679 days.

(21) Appl. No.: 10/236,876

(22) Filed: Sep. 6, 2002

(65) Prior Publication Data

US 2004/0046456 A1    Mar. 11, 2004

(51) Int. Cl.
    *H01H 3/26* (2006.01)
(52) U.S. Cl. .................. 307/151; 307/64; 307/140; 363/21.04; 363/21.05; 363/21.11; 363/41; 713/501; 700/298
(58) Field of Classification Search .............. 363/41, 363/21.04, 21.05, 21.11, 39, 40; 307/151, 307/140, 64; 713/501; 700/298
    See application file for complete search history.

(56) References Cited

U.S. PATENT DOCUMENTS

| | | | | |
|---|---|---|---|---|
| 4,097,863 A * | 6/1978 | Chambers | ................... | 342/175 |
| 4,100,369 A * | 7/1978 | Stenstrom et al. | .......... | 375/308 |
| 5,191,519 A * | 3/1993 | Kawakami | ................... | 363/71 |
| 5,233,546 A * | 8/1993 | Witte | ............................. | 708/3 |
| 5,315,533 A * | 5/1994 | Stich et al. | ................. | 700/298 |
| 5,347,442 A * | 9/1994 | Henmi et al. | ................. | 363/41 |
| 5,377,092 A * | 12/1994 | Rowand et al. | ............... | 363/41 |
| 5,526,252 A * | 6/1996 | Erdman | ....................... | 363/41 |
| 5,812,831 A * | 9/1998 | Crocker | ..................... | 713/500 |
| 5,815,381 A * | 9/1998 | Newlin | ........................ | 363/17 |
| 5,901,176 A * | 5/1999 | Lewison | ..................... | 375/238 |
| 5,914,866 A * | 6/1999 | Eguchi et al. | ................ | 363/40 |
| 5,929,538 A * | 7/1999 | O'Sullivan et al. | .......... | 307/66 |
| 5,930,131 A * | 7/1999 | Feng | ........................ | 363/56.03 |
| 6,118,680 A * | 9/2000 | Wallace et al. | ............... | 363/71 |
| 6,124,814 A * | 9/2000 | Lee et al. | .................... | 341/143 |
| 6,134,127 A * | 10/2000 | Kirchberg | .................... | 363/41 |
| 6,201,720 B1 | 3/2001 | Tracy et al. | .................. | 363/95 |
| 6,327,162 B1 * | 12/2001 | Larsen et al. | ................. | 363/51 |
| 6,813,319 B1 * | 11/2004 | Nagle et al. | ................ | 375/302 |
| 7,058,464 B2 * | 6/2006 | Mallinson | .................... | 700/94 |
| 2003/0002600 A1 * | 1/2003 | Twu et al. | ................... | 375/334 |
| 2004/0032230 A1 * | 2/2004 | Schwarz et al. | ............ | 318/254 |
| 2004/0080966 A1 * | 4/2004 | Chadwick et al. | ......... | 363/132 |
| 2004/0165661 A1 * | 8/2004 | Braun | ....................... | 375/238 |
| 2004/0232898 A1 * | 11/2004 | Morris et al. | ............... | 323/282 |
| 2005/0110667 A1 * | 5/2005 | Borisavljevic | ............. | 341/152 |

* cited by examiner

*Primary Examiner*—Chau N. Nguyen
*Assistant Examiner*—Daniel Cavallari
(74) *Attorney, Agent, or Firm*—Myers Bigel Sibley & Sajovec

(57) ABSTRACT

A closed loop power converter circuit of a UPS or other power supply includes a pulse width modulator circuit in a forward path of the closed loop power circuit. A compensation circuit provides pulse width commands to the pulse width modulator at a first rate. A feedback circuit digitally filters samples of an output of the closed loop power converter at a second rate greater the first rate and that provides the filtered samples to the compensation circuit. In some embodiments, the compensation circuit may be operative to compensate for the phase lag associated with a low pass output filter.

34 Claims, 10 Drawing Sheets

PWM POWER SUPPLIES USING CONTROLLED FEEDBACK TIMING AND METHODS OF OPERATING SAME

BACKGROUND OF THE INVENTION

The present invention relates to power conversion apparatus and methods, and more particularly, to power supply apparatus and methods of operating the same.

Traditionally, uninterruptible power supplies (UPSs) largely used analog control techniques to control power conversion circuitry, such as pulse width modulators (PWMs). However, recent years have brought increased use of digital control techniques in UPSs, typically implemented in a microprocessor, microcontroller or digital signal processor (DSP).

A typical UPS may include a closed loop PWM circuit that includes a PWM that generates an AC output voltage from a DC source, e.g., a battery and/or rectifier output. A low pass filter is typically included in the loop at the output of the PWM circuit. The low pass filter may be used to filter out unwanted high frequency components generated by the operation of the PWM and thereby provide a smoothed AC output voltage waveform.

A potential problem with such an output filter is that it may introduce a complex pole in the transfer function of the loop circuit at a frequency that can degrade function of the loop. In particular, such a complex pole can provide sufficient additional phase lag at the unity gain crossover point of the loop such that the loop lacks sufficient phase margin to remain stable in response to step changes in the loading of the UPS or in response to the presence of non-linear loads. Conventionally, analog circuitry has been used to compensate for such a filter pole.

SUMMARY OF THE INVENTION

In some embodiments of the invention, a UPS includes a DC power source and a closed loop power converter circuit operative to produce an AC output from the DC power source. The closed loop power converter circuit includes a pulse width modulator circuit in a forward path of the closed loop power circuit, coupled to the DC power source. A compensation circuit provides pulse width commands to the pulse width modulator circuit at a first rate. A feedback circuit digitally filters samples of the AC output at a second rate greater than the first rate and provides the filtered samples to the compensation circuit.

The closed loop power converter circuit may include a low pass filter coupled to an output of the pulse width modulator circuit. The low pass filter may contribute a phase lag at a unity gain crossover frequency of the closed loop power converter circuit. In some embodiments, the compensation circuit may be operative to compensate for the phase lag associated with the low pass filter. For example, the compensation circuit may include a high pass IIR filter, operating at the first rate, that compensates for a pole associated with the low pass output filter, while the feedback circuit includes a low pass filter, operating at the second rate, that compensates for a frequency response peak associated with the high pass filter. In other embodiments, the feedback circuit may be operative to compensate for the phase lag associated with the low pass filter, e.g., the feedback circuit may include an IIR filter, operating at the second rate, that provides benefits similar to the aforementioned combination of low and high pass filters.

According to further embodiments of the invention, a closed loop power converter circuit includes a pulse width modulator circuit in a forward path of the closed loop power circuit, configured to be coupled to a DC power source. A compensation circuit provides pulse width commands to the pulse width modulator circuit at a first rate. A feedback circuit digitally filters samples of the output at a second rate greater than the first rate and provides the filtered samples to the compensation circuit.

In further embodiments of the invention, a closed loop power converter circuit includes a pulse width modulator circuit in a forward path of the closed loop power circuit, configured to be coupled to the DC power source. A compensation circuit provides pulse width commands to the pulse width modulator circuit at first times that occur at a predetermined rate. A time-offset feedback circuit samples the output voltage at second times that occur at the predetermined rate and that are offset with respect to the first times, and provides the filtered samples to the compensation circuit. The compensation circuit may distribute portions of a computation of a given pulse width command among time periods before and after an immediately preceding sample used to compute the pulse width command, so that latency of the sample is reduced.

In some method embodiments of the invention, an AC output is generated responsive to pulse width commands provided to a pulse width modulated power converter circuit of a UPS. The pulse width commands are generated at a first rate from second-rate samples of the AC output, wherein the second rate greater than the first rate. In further method embodiments, a PWM-based closed loop power converter circuit of a power supply is operated by digitally compensating the closed loop power converter circuit at a first rate responsive to samples of an output of the closed loop output circuit that are digitally filtered at a second rate that is greater than the first rate.

Power supply apparatus and methods according to the invention can provide several advantages over conventional apparatus and methods. In particular, using different rates for feedback filtering and compensation in a power converter loop according to the invention can provide improved phase margin and, therefore, stability, without requiring the use of analog control networks and/or high modulation rates.

DETAILED DESCRIPTION OF EMBODIMENTS

Figure 1A:
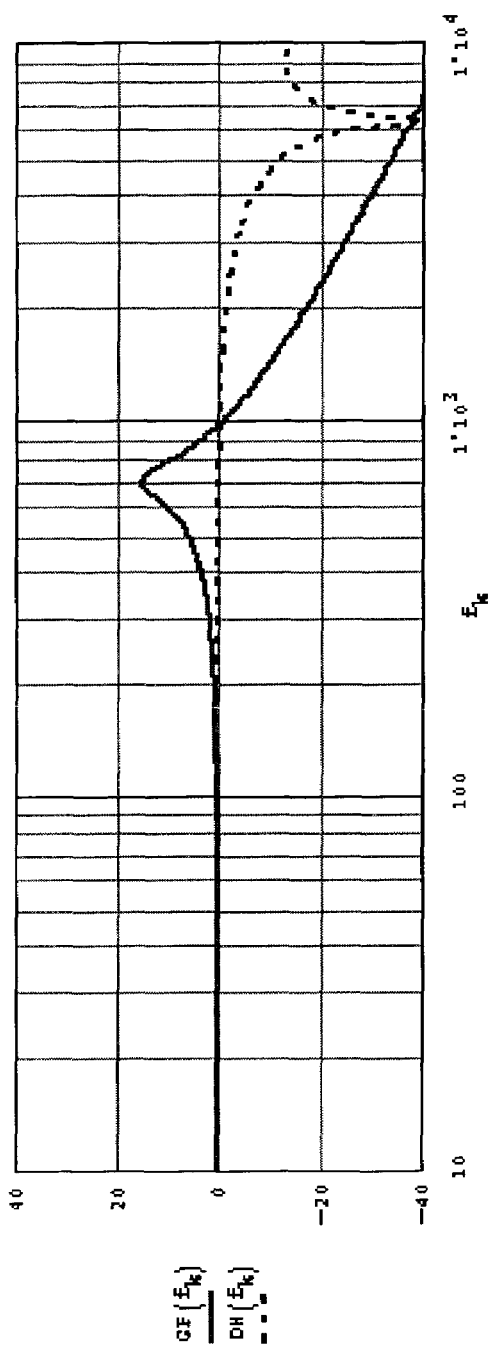
FIGS. 1A, 1B, 2A and 2B illustrate frequency responses of power converters.

The present invention will now be described more fully with reference to the accompanying drawings, in which exemplary embodiments of the invention are shown. These embodiments are provided so that this application will be thorough and complete. In the drawings, like numbers refer to like elements. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As discussed above, analog techniques have conventionally been used to compensate for undesirable phase lag associated with a low pass output filter in a power supply, such as a UPS. Translating these techniques to a digital control domain may be problematic.

Figure 1B:
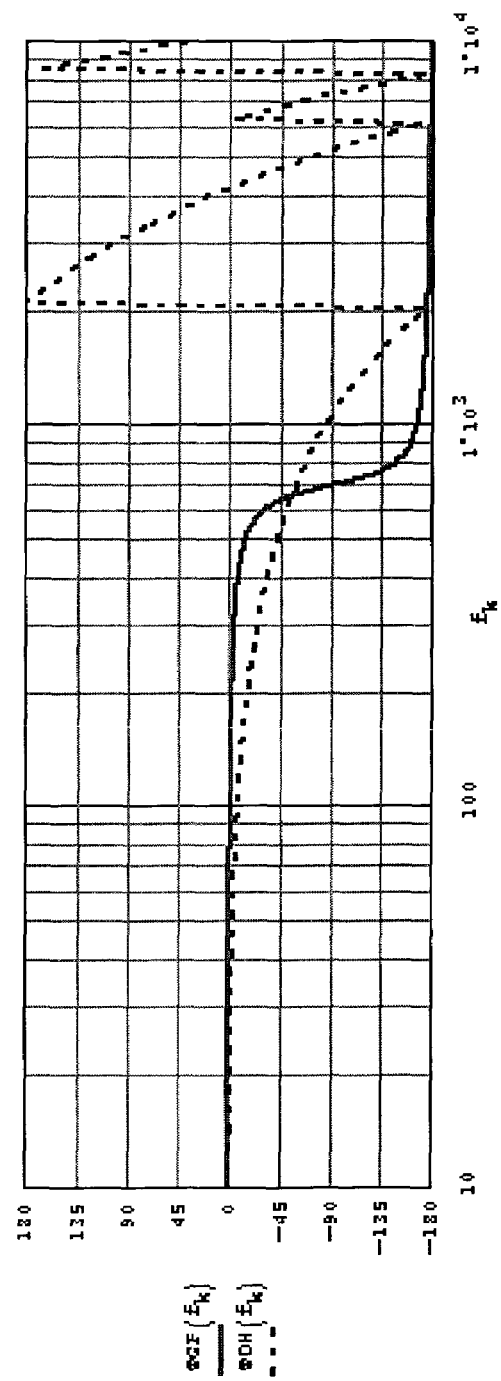

Referring to FIGS. 1A and 1B, bold lines illustrate simulated gain and phase for a loop transfer function of a PWM-based closed loop output power converter circuit of a UPS. As can be seen from the plot, a low pass output filter in the power converter circuit produces a complex pole at approximately 700 Hz that contributes appreciable phase lag.

Still referring to FIGS. 1A and 1B, a potential problem with digital control of such a loop is illustrated by the dotted lines, which show delay associated with digital control techniques in which the output voltage feedback sampling rate is the same as the PWM rate. This delay makes it difficult, if not impossible, to provide sufficient lead to compensate for the lag associated with the output filter.

Figure 2A:
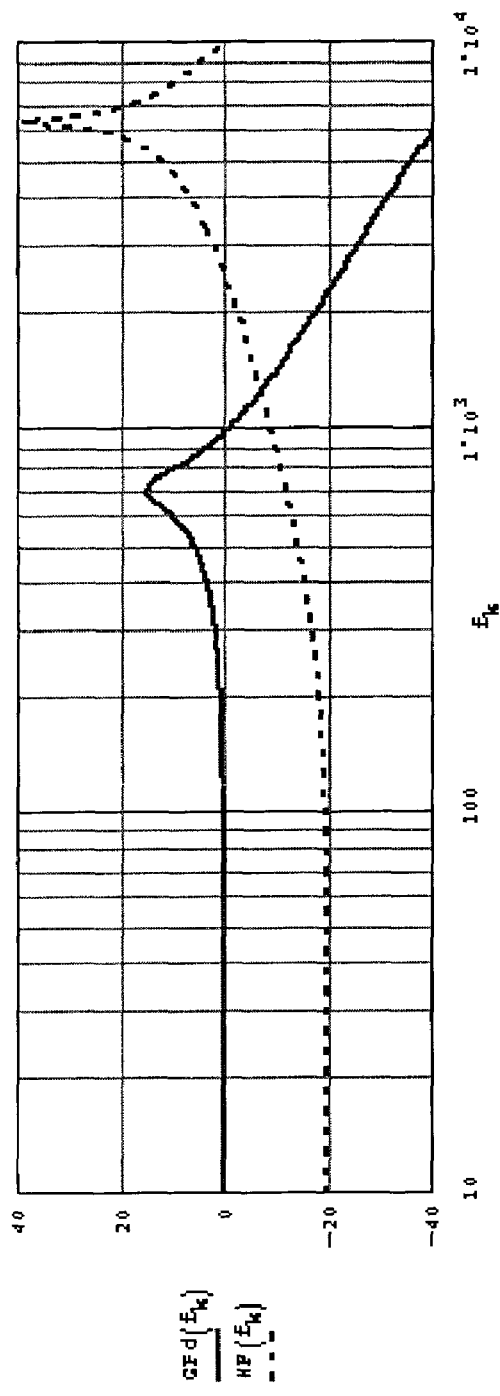
Figure 2B:
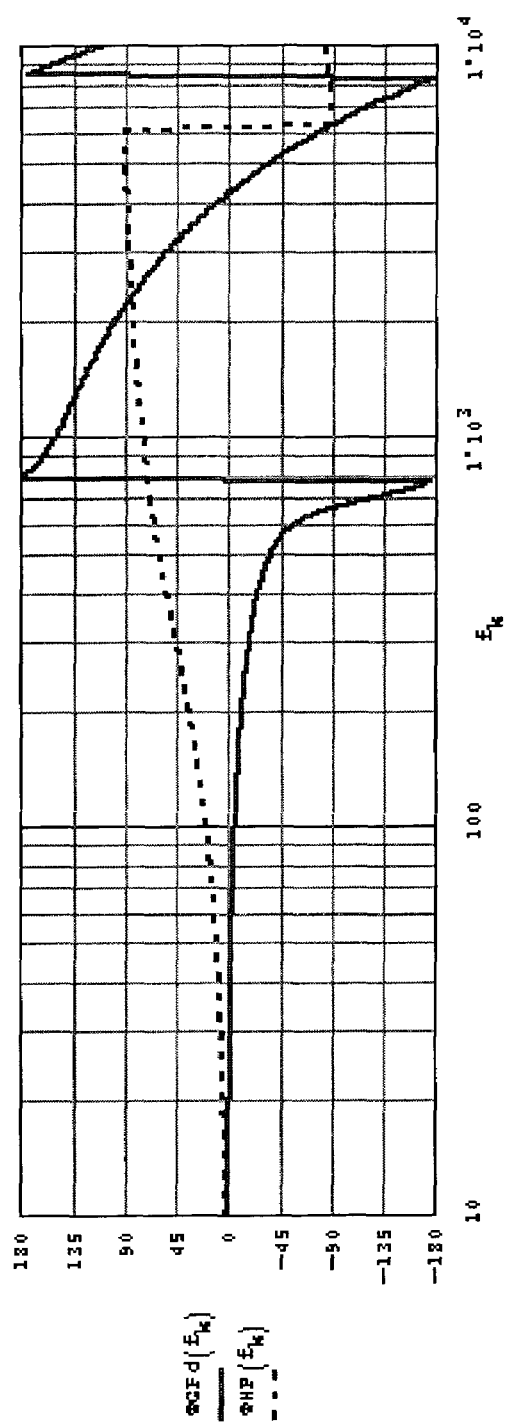

FIGS. 2A and 2B illustrate further potential difficulties involved in digital compensation for an output filter pole. In particular, the solid lines of FIGS. 2A and 2B illustrate simulated gain and phase for low pass filter with a digital delay added to it when commands are provided to a PWM at a rate twice that of the PWM frequency, i.e., where pulse width commands are provided for both positive and negative transitions of the PWM waveform. The dotted lines of FIGS. 2A and 2B show a digital high pass filter in which the AC output voltage is sampled at the PWM command rate. Although this approach can provide significant phase lead to compensate for the output filter delay, it also produces a gain peak (theoretically, an infinity) at around half the sampling frequency, associated with a digital high pass filter (dotted line) used to compensate the pole. Although adding a pole in the digital compensation could theoretically compensate this peak, the pole would generally add phase lag that works against the lead provided by the higher pass filter. According to some embodiments of the invention, such difficulties may be overcome by using a higher sampling and filtering rate for the feedback to a PWM control loop than the rate at which compensation of the PWM is performed.

Figure 3:
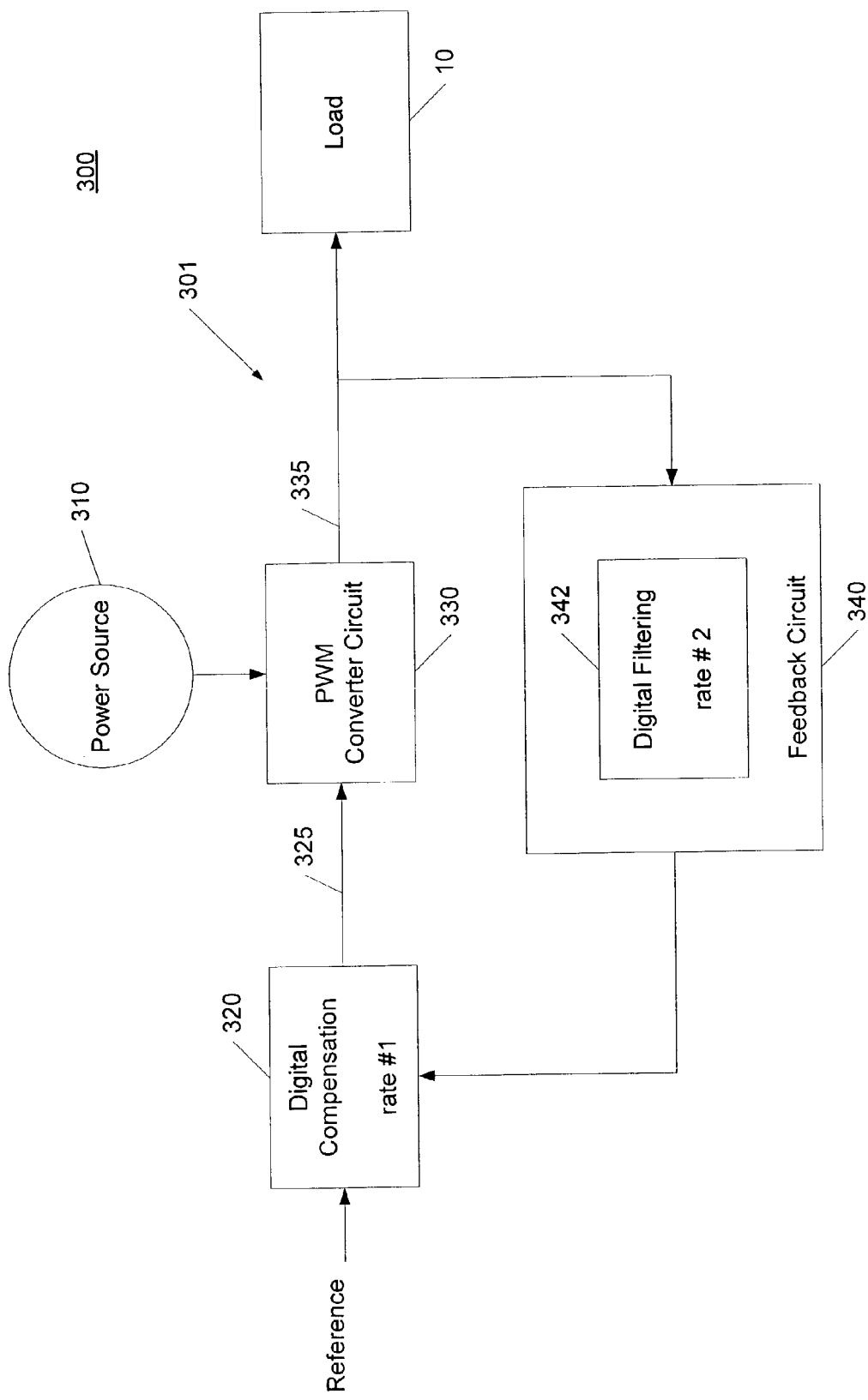
FIG. 3 is a schematic diagram of a UPS according to some embodiments of the invention.

FIG. 3 illustrates a power supply 300 and operations thereof according to some embodiments of the invention. The power supply 300 includes a DC power source 310, for example, a rectifier, battery or other DC power source. The power supply 300 further includes a closed loop power converter circuit 301 that produces an output voltage 335. The closed loop power converter circuit 301 includes a digital compensation circuit 320 that provides pulse width command inputs 325 at a first rate to a PWM converter circuit 330, which is coupled to the power source 310 and provides an output 335 to a load 10. The closed loop power converter circuit 301 further includes a feedback circuit 340 that includes a digital filtering circuit 342 that digitally filters samples of the output voltage 335 at a second rate that is higher than the first rate.

In various embodiments of the invention, the digital compensation circuit 320 and the feedback circuit 340 can be configured to compensate for phase lag associated with an output filter pole of the PWM converter circuit 330. For example, the compensation circuit 320 may include a high pass filter that compensates for the output filter pole, while the filtering circuit 342 of the feedback circuit 340 may comprise a low pass filter that compensates for a peak associated with the high pass filter. In other embodiments, the feedback circuit 340 may include a filter that provides similar functionality to that provided by such a combination of low pass and high pass filters. It will be understood that, although these and other specific control loop topologies are described specifically herein for purposes of illustration, for example, in reference to FIGS. 4-7, the invention includes any of a number of other specific loop topologies, such as substantially similar control configurations that place gain and/or phase operations (e.g., filters) in different loop locations than shown in the illustrated embodiments.

Figure 4:
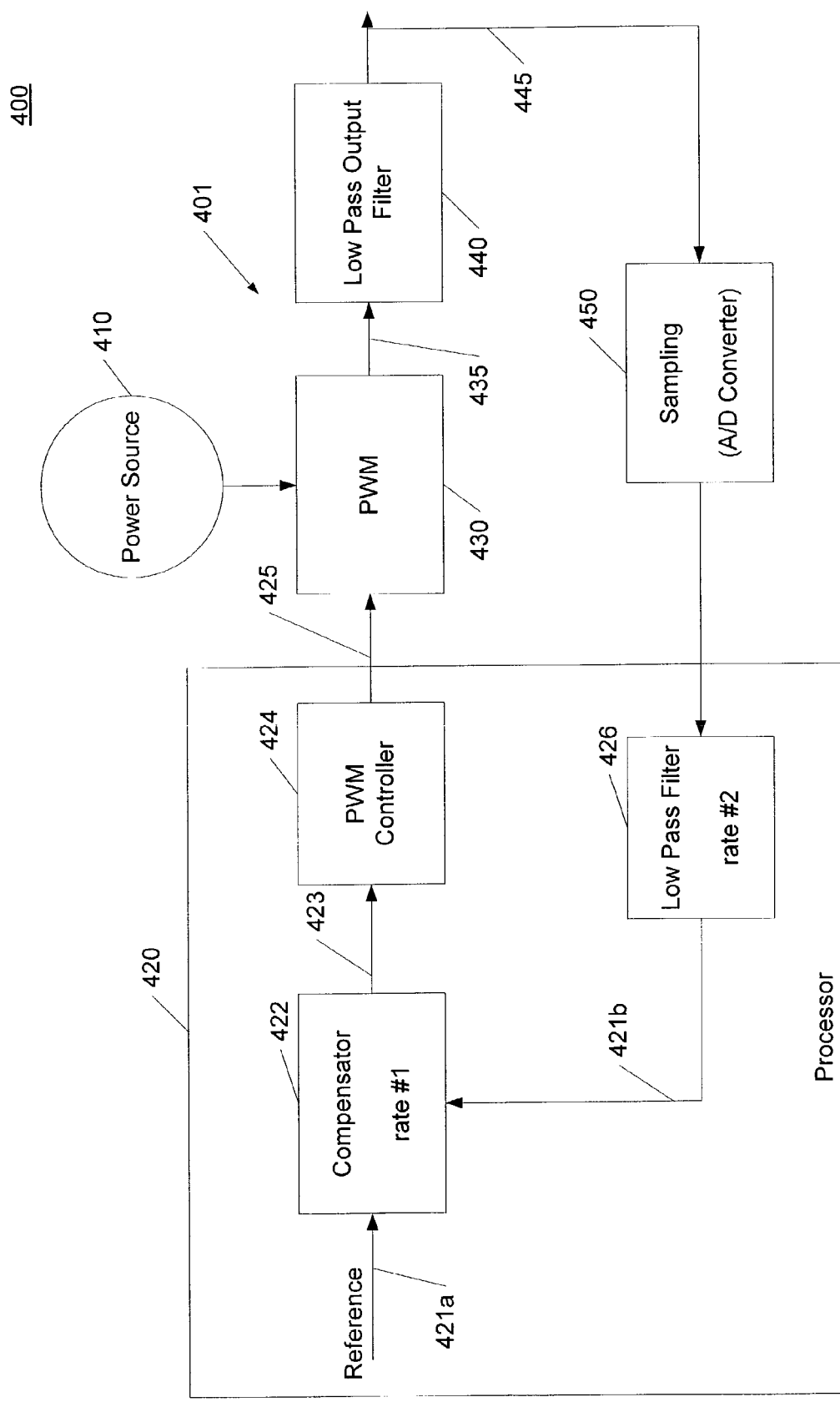
FIG. 4 is a schematic diagram of a UPS according to further embodiments of the invention.

FIG. 4 illustrates a power supply 400 and operations thereof according to further embodiments of the invention. The power supply 400 includes a DC power source 410 that is coupled to a pulse width modulator (PWM) circuit 430 in a forward path of a closed loop power converter circuit 401. The PWM circuit 430 generates an AC output 435 from the DC power source 410. A low pass output filter 440 is coupled to an output of the PWM circuit 430 and produces a filtered AC output voltage 445 from the AC output 435 of the PWM circuit 430.

The PWM circuit 430 operates responsive to one or more switch control signals 425 generated by a PWM controller circuit 424, here shown as implemented in a processor 420, such as a DSP, microprocessor, microcontroller, application-specific integrated circuit (ASIC), or the like. For example, the PWM circuit 430 may comprise a single or multiphase transistor bridge circuit that selectively couples the DC power source 410 to the output filter 440 responsive to the one or more switch control signals 425. Such bridge circuitry is known to those skilled in the art, and will not be discussed in further detail herein.

The PWM controller circuit 424 develops the one or more switch control signals 425 responsive to a pulse width command signal 423 generated at a first rate by a compensation circuit 422, here shown as also implemented in the processor 420. For example, the pulse width command signal 423 may comprise a sequence of values, e.g., digital counts, that are indicative of times at which transistor switches in the PWM circuit 430 are to operate. The PWM controller circuit 424 may, for example, compare these values to a running counter, and may generate the one or more switch control signals 425 responsive to the comparison such that the transistor switches in the PWM circuit 430 operate at the indicated times. In this manner, pulse widths produced by the PWM circuit 430 can be modulated.

The compensation circuit 422 receives a reference input signal 421a, such as a reference sine wave signal. The compensation circuit 422 compares the reference input signal 421a to a feedback signal 421b produced from samples of the AC output 445 that are produced and filtered at a second, higher rate via a sampling circuit (e.g., A/D converter) 440 and a digital low pass filter 426 (also implemented in the processor 410), and responsively produces the pulse width command signal 423. The compensation circuit 422 may include, for example, additional filtering and/or gain needed to provide desirable response characteristics for the closed loop power converter circuit 401.

Figure 5:
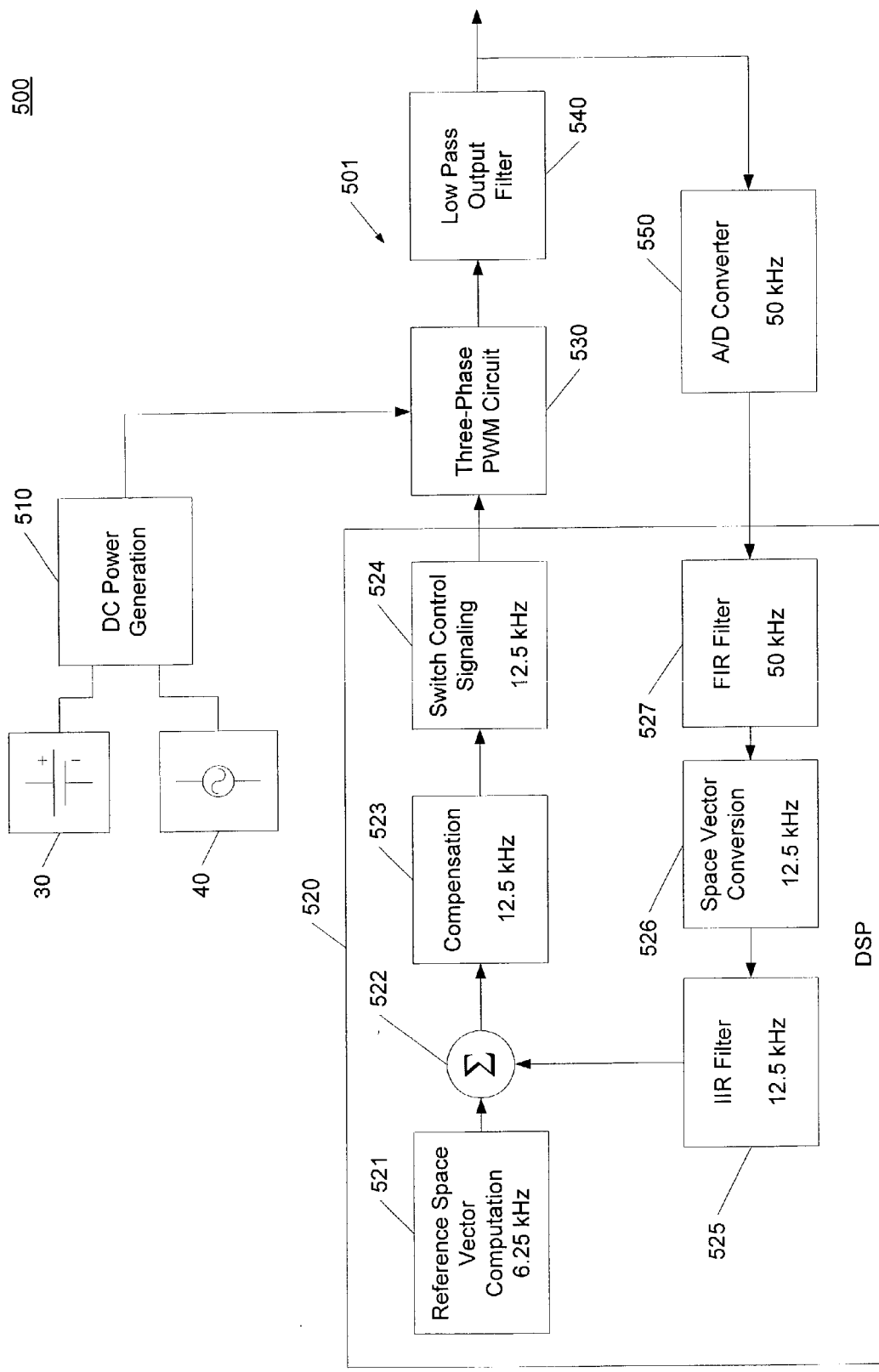
FIG. 5 is a schematic diagram of a three-phase UPS according to some embodiments of the invention.

FIG. 5 illustrates a three-phase UPS 500 according to further embodiments of the invention. The UPS 500 includes a DC power generation circuit 510, such as a circuit capable of generating DC power from one or more sources, for example, a battery 30 and/or an AC utility source 40. The DC power generation circuit 510 is coupled to a three-phase PWM circuit 530 in a forward path of a three-phase closed loop power converter circuit 501 that is implemented using a DSP 520 that controls the PWM circuit 530. In particular, the DSP 520 is configured to implement a switch control signaling algorithm 524 that develops control signals for the PWM circuit 530 responsive to pulse width commands provided at a rate of 12.5 kHz by a compensation algorithm 523, also implemented in the DSP 520. The compensation algorithm 523 produces the pulse width commands responsive to an error signal produced at a summing junction 522 by comparison of a reference space vector signal produced by a reference space vector computation algorithm 521 to a feedback signal produced by a feedback path coupled to a low pass output filter 540, which is coupled to the output of the PWM circuit 530.

As shown, the feedback path includes an A/D converter 550 that samples the output of the output filter 540, e.g., phase to neutral voltages, at a higher 50 kHz rate. The feedback further includes a non-recursive finite impulse response (FIR) filter 527, implemented in the DSP 520 that filters the samples produced by the A/D converter 550. The FIR filter 527 may be, for example, a low pass averaging filter that averages the samples for several consecutive periods (e.g., eight). The filtered output of the FIR filter 527 is converted to a space vector coordinate domain by a space vector conversion algorithm 526 that runs at the slower 12.5 kHz rate of the compensation algorithm 523. The space vector domain signal produced by the space vector conversion algorithm 526 is then high pass filtered at the 12.5 kHz rate using a recursive infinite impulse response (IIR) filter 525 before comparison with the reference space vector signal. The IIR filter 525 can compensate for the phase lag associated with the low pass output filter 540, while the oversampling and filtering provided by the A/D converter 550 and the FIR filter 527 can compensate for undesirable effects (such as "infinities") associated with the IIR filter 525.

Although the FIR filter 527 may be a relatively simple averaging filter as described above, a more complex filter may be used to provide, for example, anti-aliasing. It will also be appreciated that, although space vector domain control is illustrated in FIG. 5, non-space vector control techniques may also be used with the present invention.

Figure 6:
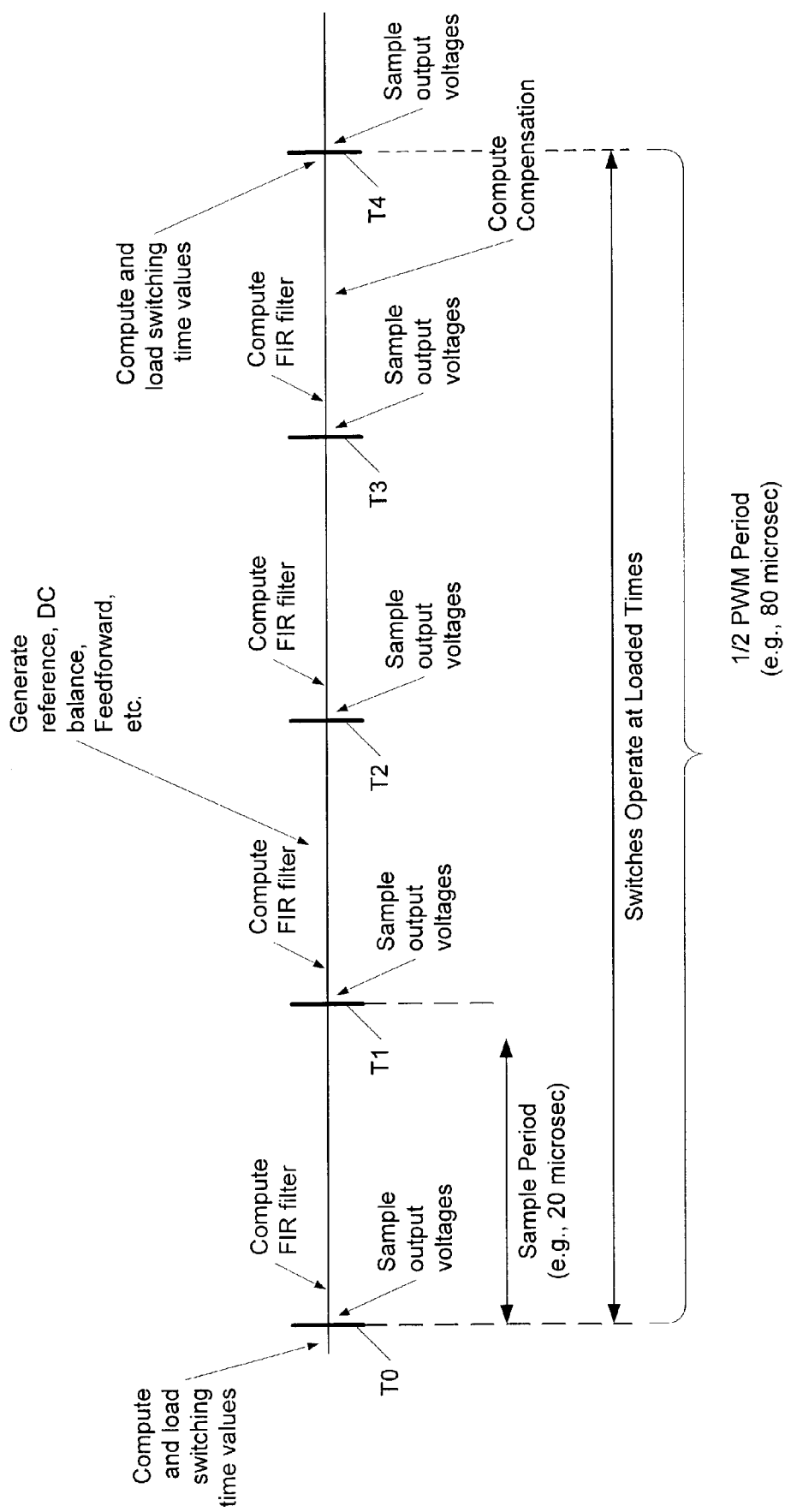
FIG. 6 is a timing diagram illustrating exemplary timing relationships for control computations in the UPS of FIG. 5.

FIG. 6 illustrates exemplary time line relationships for a configuration such as that illustrated in FIG. 5. At or near a time T0, output voltages are sampled, followed by updating of the FIR filter output. These operations are repeated at 20 microsecond intervals, e.g., at or near times T1, T2, T3, T4, and so on. Near time T4, the compensation algorithm 523 is computed to develop new pulse width commands for the switch control signaling algorithm 524 using feedback information from preceding sample periods. The switch control signaling algorithm 524 may, for example, determine appropriate transistor drive control signals based on the pulse width commands and knowledge of the space vector sector the converter 501 is currently operating. Exemplary space vector control techniques for a three-phase UPS are described in U.S. Pat. No. 6,201,720 to Tracy et al., the contents of which are incorporated herein by reference in their entirety. As also shown in FIG. 6, other computations, such as computation of the reference and DC feedforward and balance values that are used in the compensation algorithm, may be scheduled at various points in the timeline to provide efficient use of computational resources.

Figure 7:
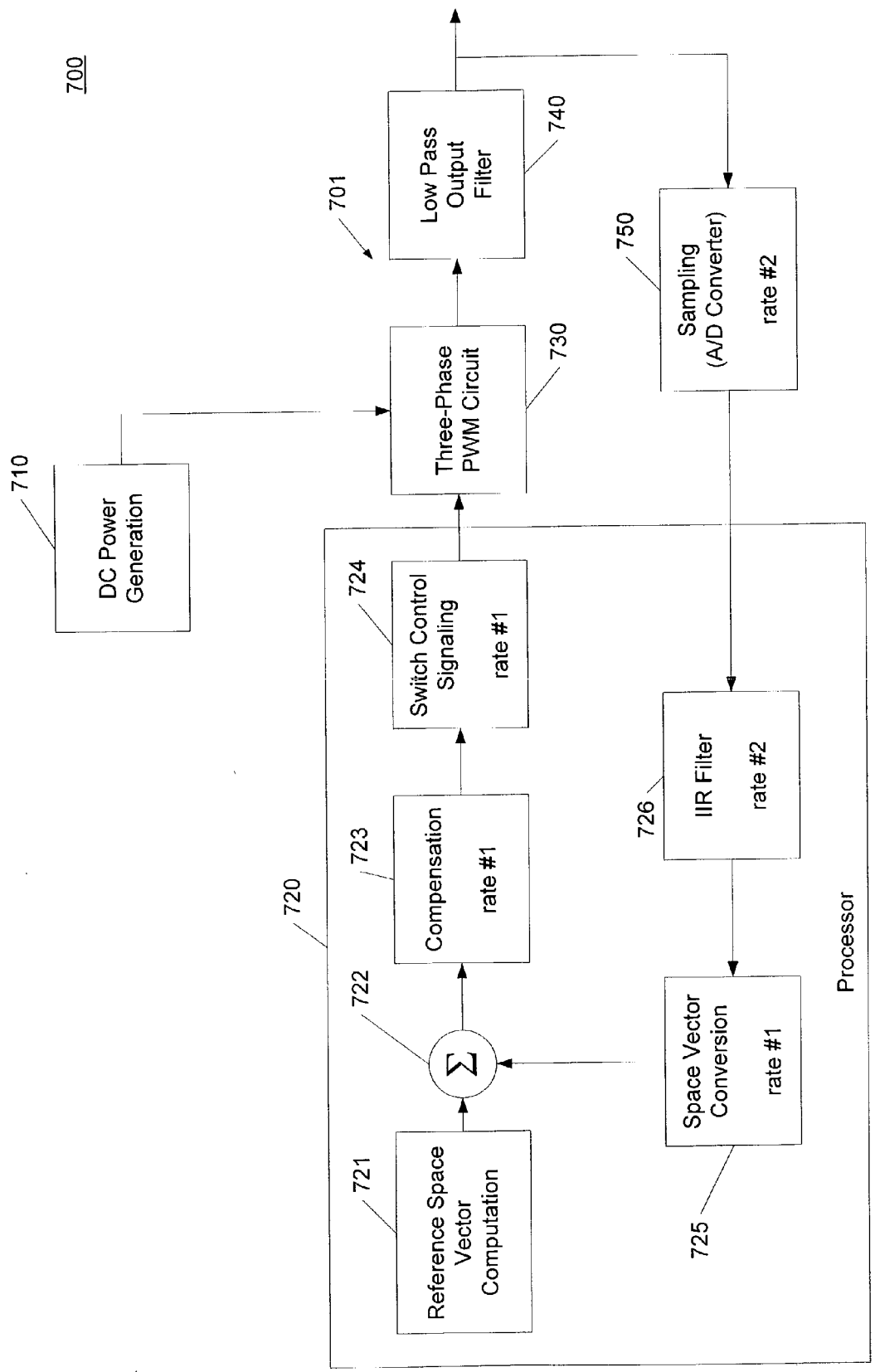
FIG. 7 is a schematic diagram of a three-phase UPS according to further embodiments of the invention.

FIG. 7 illustrates a three-phase UPS 700 according to still further embodiments of the invention. The UPS 700 includes a DC power generation circuit 710 coupled to a three-phase PWM circuit 730 in a forward path of a three-phase closed loop power converter circuit 701 that is implemented using a DSP 720 that controls the PWM circuit 730. The DSP 720 is used to implement a switch control signaling algorithm 724 that develops control signals for the PWM circuit 730 responsive to pulse width commands provided at a first rate by a compensation algorithm 723, also implemented in the DSP 720. The compensation algorithm 723 produces the pulse width commands responsive to an error signal produced at a summing junction 722 by comparison of a reference space vector signal produced by a reference space vector computation algorithm 721 to a feedback signal produced by a feedback path coupled to a low pass output filter 740, which is coupled to the output of the PWM circuit 730.

In the embodiments of FIG. 7, the feedback path includes an A/D converter 750 that samples the output of the output filter, e.g., phase to neutral voltages, at a second rate that is greater than the first rate. The samples produced by the A/D converter 750 are filtered at the second rate by a recursive IIR filter 726 implemented in the DSP 720. The filtered output of the IIR filter 726 is then converted to a space vector coordinate domain by a space vector conversion algorithm 725 that runs at the slower first rate of the compensation algorithm 723. The space vector domain signal produced by the space vector conversion algorithm 725 is compared with the reference space vector signal. The IIR filter 726 can provide additional lead at a unity gain crossover frequency of the closed loop power converter circuit 701 that compensate for phase lag associated with the output filter 740 in a manner similar to that provided by the combination of the FIR filter 527 and the IIR filter 525 of FIG. 5.

Figure 8A:
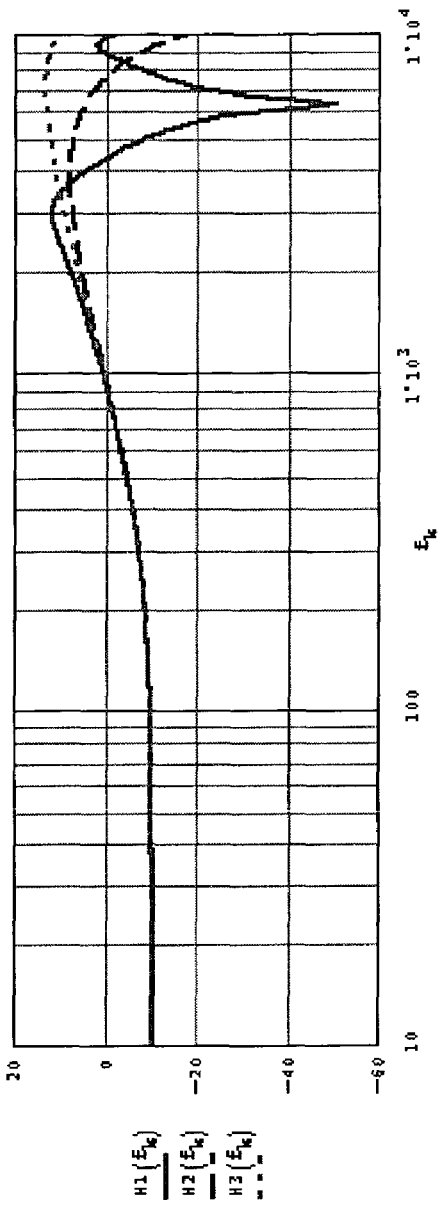
FIGS. 8A and B illustrate frequency responses of power converters according to some embodiments of the present invention.
Figure 8B:
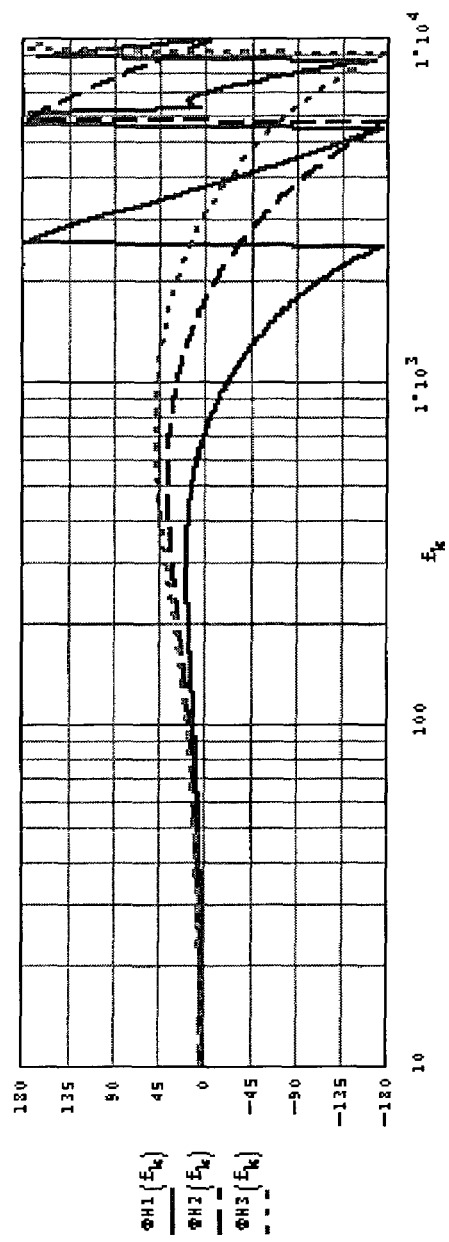

FIGS. 8A and 8B illustrate advantages that can be realized by different embodiments of this invention. The solid lines represents a base case gain and phase response where compensation processing is done at a rate of 6.25 kHz, using no feedback FIR filter and a IIR compensation filter that includes a "zero" at 300 Hz and a "pole" at 2485 Hz. A data hold and full cycle delay for a 6.25 kHz digital loop are included.

In contrast, the dashed lines illustrate gain and phase response for a combination of a feedback FIR filter (such as FIR filter 527 of FIG. 5), a feedback IIR filter (such as IIR filter 525 of FIG. 5), and a processing timeline along the lines described with reference to FIG. 6, i.e., the FIR filtering is performed at 50 kHz and is the average of the past 8 samples, while the IIR filtering and compensation calculations are done at 12.5 kHz (twice the PWM rate as described above), and a data hold for 12.5 kHz is included. The FIR filter has a "zero" at 300 Hz, and the "infinity" created at 6.25 kHz is compensated by the 8-tap FIR filter.

The dotted line represents a modification of the configuration and operations of FIG. 5 according to further embodiments of the invention, in which three different rates are used for low pass filtering, high pass filtering and command computation. In particular, a two-sample averaging feedback FIR filter is operated at a 50 kHz rate, space vector conversion and high pass filtering are processed at 25 kHz, and computation of PWM commands is done at 12.5 kHz. The high pass filter includes a "zero" at 300 Hz and a "pole" at 9940 Hz. A 12.5 kHz data hold and ¼ cycle delay are used. As can be seen, both approaches (dotted line and dashed line) according to embodiments of the invention can yield significant additional phase lead.

According to further aspects of the invention, a time offset between feedback sampling and command updates can provide improved digital control loop performance by reducing delay between the time at which the output voltage is sampled and the time at which a PWM command is generated from the sample, without oversampling and/or higher-rate filtering as described above with reference to FIGS. 3-8.

Figure 9:
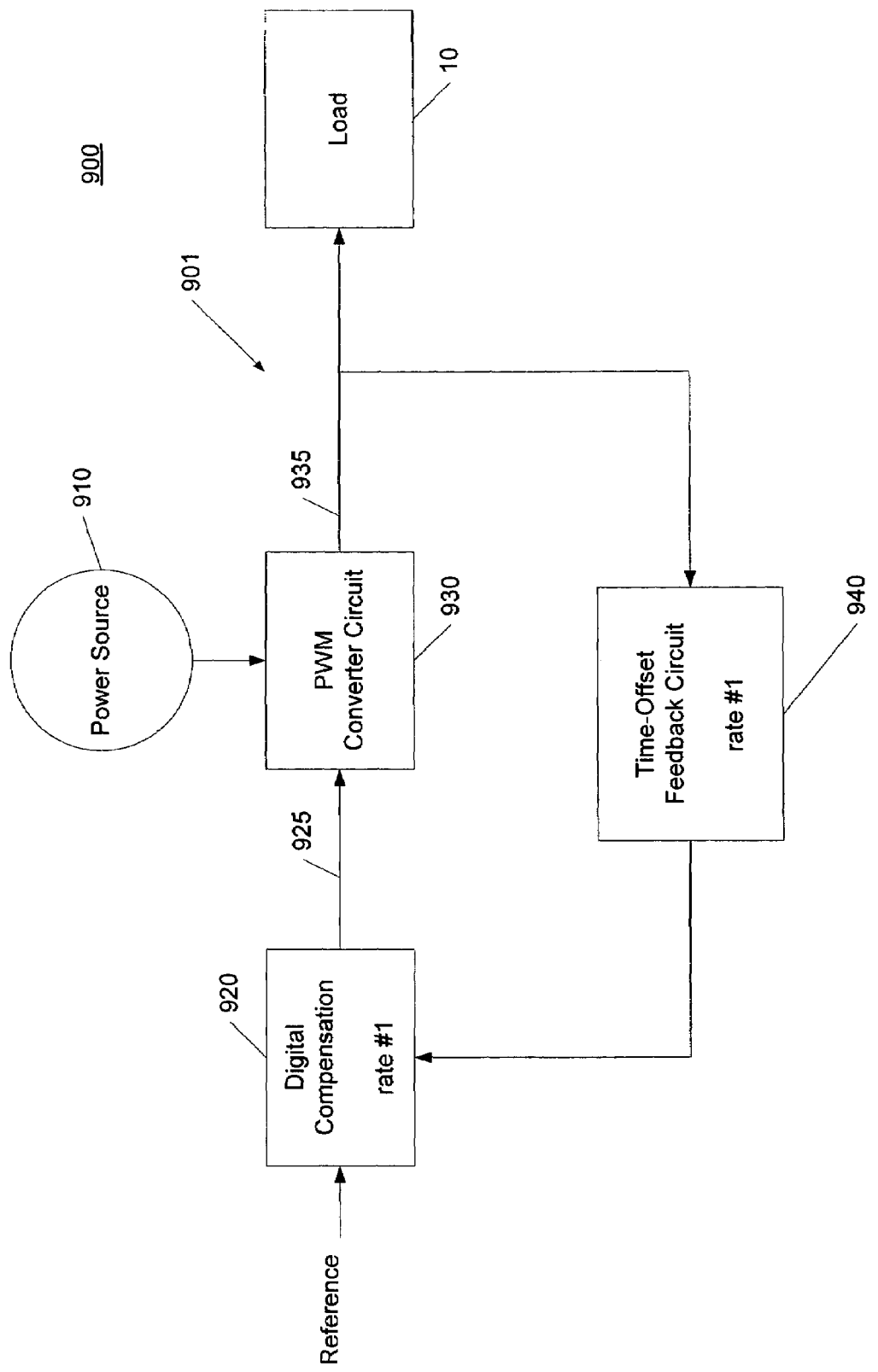
FIG. 9 illustrates a UPS according to further embodiments of the invention.
Figure 10:
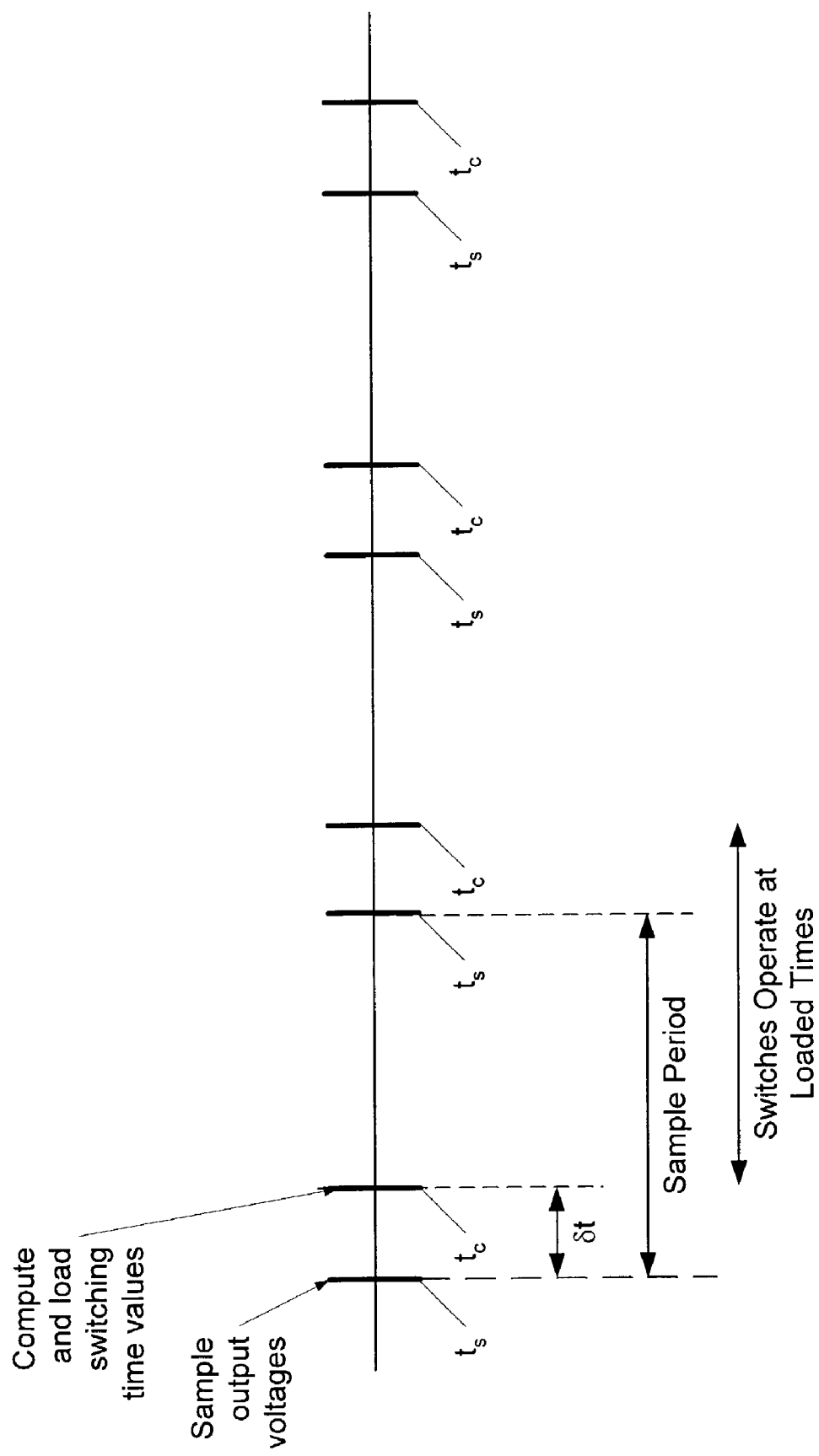
FIG. 10 is a timing diagram illustrating exemplary timing relationships for control computations in the UPS of FIG. 9.

For example, a power supply 900 and operations thereof according to further embodiments of the invention illustrated in FIG. 9 may include a DC power source 910 and a closed loop power converter circuit 901 that produces an output voltage 935 from the DC power source 910. The closed loop power converter circuit 901 includes a digital compensation circuit 920 that provides pulse width commands 925 to a PWM converter circuit 930, which is coupled to the power source 910 and provides an output 935 to a load 10. The closed loop power converter circuit 901 further includes a time-offset feedback circuit 940 that samples the output voltage 935 at the same rate that the compensation circuit provides the pulse width commands 925, but with a timing that is offset with respect to the pulse width commands 925 so as to reduce or minimize latency of the samples when computing the commands 925 and thereby reduce or minimize phase lag associated with the digital compensation. For example, as shown in the exemplary timeline of FIG. 10, times $t_s$ at which samples of the output voltage are obtained may occur at the same rate as times $t_c$ at which PWM commands are generated, but may be offset by a time interval t with respect to the times $t_c$ that is minimized to the amount of time needed to perform compensation calculations based on the samples.

Such as time line may be accomplished by using a counter included in a PWM controller, such as the counter described above with reference to PWM controller circuit 424 of FIG. 4. In such a circuit, for example, a counter may count up, and the PWM controller may responsively switch when the counter reaches a previously loaded switching time value. Sampling and compensation routines may be both triggered at respective different counts of this same counter. The timing of the sampling and/or command updates need not be lined up with the PWM switching cycle. Generally, the shorter the time between the final sample and the load, the better performance obtained.

Computations may be further streamlined by only performing the portion of the compensation algorithm that depends on the last sample in the interim between the sample and the generation of the command update that depends on it. This may be illustrated by the following example equation:

$$Y = X0 \times Z^0 - X1 \times Z^{-1} + X2 \times Z^{-2} + Y1 \times Z^{-1} - Y2 \times Z^{-2}$$

In this equation, which represents a digital control function that implements two poles and two zeros to produce a command Y (which may represent a PWM switching time command), the "$Z^0$" represents the current cycle data and "$Z^{-1}$, $Z^{-2}$" represent data for the previous two computational cycles. "X0, X1, X2" correspond to present and past two inputs to the equation, and "Y1, Y2" represent the past two results. All the terms where the "Z" has a negative superscript may be precomputed before the last sample is obtained, leaving computation of the "$Z^0$" term and the final sum "Y" to the interval between the last sample and the PWM switching command time. This can allow this interval to be reduced to a minimal duration.

In the drawings and specification, there have been disclosed exemplary embodiments of the invention. Although specific terms are employed, they are used in a generic and descriptive sense only and not for purposes of limitation.

The invention claimed is:

1. A UPS, comprising:
a DC power generation circuit; and
a closed loop power converter circuit operative to produce an AC output from the DC power generation circuit, the closed loop power converter circuit including:
a pulse width modulator circuit in a forward path of the closed loop power converter circuit, coupled to the DC power generation circuit;
a compensation circuit that provides pulse width commands to the pulse width modulator at a first rate;
a sampling circuit configured to generate samples of the AC output; and
a feedback circuit that digitally filters the samples of the AC output at a second rate greater than the first rate and that provides the filtered samples to the compensation circuit.

2. A UPS according to claim 1, wherein the closed loop power converter circuit further comprises a low pass filter coupled to an output of the pulse width modulator circuit, wherein the feedback circuit is coupled to the output of the low pass filter, and wherein the low pass filter is configured to contribute a phase lag at a unity gain crossover frequency of the closed loop power converter circuit.

3. A UPS according to claim 2, wherein the low pass filter has a pole at a frequency less than the unity gain crossover frequency.

4. A UPS according to claim 2, wherein compensation circuit is operative to compensate for the phase lag associated with the low pass filter.

5. A UPS according to claim 2, wherein the feedback circuit is operative compensate for the phase lag associated with the low pass filter.

6. A UPS according to claim 1, wherein the feedback circuit comprises a digital low pass filter operative to low pass filter the samples at the second rate.

7. A UPS according to claim 6, wherein the digital low pass filter comprises a non-recursive low pass filter.

8. A UPS according to claim 6, wherein the compensation circuit further comprises a digital high pass filter that high pass filters the low pass filtered samples at the first rate and wherein the compensation circuit is operative to generate the pulse width commands responsive to the high pass filtered samples.

9. A UPS according to claim 6, wherein the compensation circuit further comprises a digital high pass filter that high pass filters the low pass filtered samples at a third rate that is greater than the first rate and less than the second rate, wherein the compensation circuit is operative to generate the pulse width commands responsive to the high pass filtered samples.

10. A UPS according to claim 8, wherein the digital high pass filter comprises a recursive filter.

11. A UPS according to claim 1, wherein the closed loop power converter circuit comprises a low pass output filter, and wherein the feedback circuit comprises an IIR filter that operates at the second rate and that compensates for a phase lag associated with the low pass output filter.

12. A UPS according to claim 1, wherein the pulse width commands indicate times at which to operate a switch of the pulse width modulator circuit.

13. A closed loop power converter circuit for producing an output voltage from a DC power source, the closed loop power converter circuit including:
- a pulse width modulator circuit in a forward path of the closed loop power converter circuit, configured to be coupled to the DC power source;
- a compensation circuit that provides pulse width commands to the pulse width modulator circuit at a first rate;
- a sampling circuit configured to generate samples of the AC output; and
- a feedback circuit that digitally filters samples of the output voltage at a second rate greater than the first rate and that provides the filtered samples to the compensation circuit.

14. A closed loop power converter circuit according to claim 13, further comprising a low pass filter coupled to a output of the pulse width modulator circuit, the low pass filter configured to contribute a phase lag at a unity gain crossover frequency of the closed loop power converter circuit.

15. A closed loop power converter circuit according to claim 14, wherein compensation circuit is operative to compensate for the phase lag associated with the low pass filter.

16. A closed loop power converter circuit according to claim 13:
- wherein the feedback circuit comprises a digital low pass filter operative to low pass filter the samples at the second rate; and
- wherein the compensation circuit comprises a digital high pass filter that high pass filters the low pass filtered samples at the first rate.

17. A closed loop power converter circuit according to claim 13, further comprising a low pass output filter coupled to an output of the pulse width modulator, and wherein the feedback circuit comprises an IIR filter that compensates for a phase lag associated with the low pass output filter.

18. A closed loop power converter circuit for producing an output voltage from a DC power source, the closed loop power converter circuit including:
- a pulse width modulator circuit in a forward path of the closed loop power converter circuit, configured to be coupled to the DC power source;
- a compensation circuit that provides pulse width commands to the pulse width modulator circuit at first times that occur at a predetermined rate; and
- a time-offset feedback circuit that samples the output voltage at second times that occur at the predetermined rate and that are offset with respect to the first times, and that provides the filtered samples to the compensation circuit.

19. A closed loop power converter circuit according to claim 18, wherein the compensation circuit distributes portions of a computation of a given pulse width command among time periods before and after an immediately preceding sample used to compute the pulse width command.

20. A method of operating a UPS, comprising:
- generating an AC output responsive to pulse width commands provided at a first rate to a pulse width modulated power converter circuit of the UPS;
- generating samples of the AC output;
- digitally filtering the samples of the AC output at a second rate greater than the first rate; and
- generating the pulse width commands at the first rate from the digitally filtered samples of the AC output.

21. A method according to claim 20, further comprising operating the pulse-width modulated power converter circuit in a forward path of a closed loop power converter that produces the AC output with a unity gain crossover frequency, and wherein generating an AC output responsive to pulse width commands provided to a pulse width modulated converter circuit comprises low pass filtering an output of a pulse width modulator circuit receiving the pulse width commands with a low pass filter that contributes a phase lag in the closed loop at the unity gain crossover frequency.

22. A method according to claim 21, wherein generating the pulse width commands at a first rate from second rate samples of the AC output compensates for the phase lag associated with the low pass filter.

23. A method according to claim 20:
- wherein filtering the samples at the second rate comprises low pass filtering the samples at the second rate; and
- wherein generating the pulse width commands at a first rate from second-rate samples of the AC output comprises:
  high pass filtering the low pass filtered samples at the first rate;
  generating an error signal from the high pass filtered samples; and
  generating the pulse width commands from the error signal.

24. A method according to claim 23:
- wherein low pass filtering the samples at the second rate comprises low pass filtering the samples using a non-recursive low pass filter; and
- wherein high pass filtering the low pass filtered samples at the first rate comprises high pass filtering the low pass filtered samples using a recursive filter.

25. A method according to claim 20:
- wherein filtering the samples at the second rate comprises low pass filtering the samples at the second rate; and
- wherein generating the pulse width commands at a first rate from second-rate samples of the AC output comprises:
  high pass filtering the low pass filtered samples at a third rate greater than the first rate and less than the second rate;
  generating an error signal from the high pass filtered samples; and
  generating the pulse width commands from the error signal at the first rate.

26. A method according to claim 20, wherein filtering the samples at the second rate comprises applying an infinite impulse response (IIR) filter at the second rate to compensate for a pole associated with a low pass output filter of the pulse-width modulated power converter circuit.

27. A method according to claim 20, wherein the pulse width commands indicate times at which to operate a switch of the pulse width modulated power converter circuit.

28. A method of operating a closed loop power converter circuit of a power supply, the closed loop power converter circuit including a pulse width modulator in its forward path, the method comprising:
- digitally compensating the closed loop power converter circuit at a first rate responsive to samples of an output of the closed loop output circuit that are digitally filtered at a second rate that is greater than the first rate.

29. A method according to claim 28, comprising:
- low pass filtering the samples of the output at the second rate; and digitally compensating the closed loop power converter circuit at the first rate responsive to the low pass filtered samples.

30. A method according to claim 29, wherein digitally compensating the closed loop power converter circuit at a first rate responsive to samples of an output of the closed loop output circuit that are digitally filtered at a second rate that is greater than the first rate comprises:

high pass filtering the low pass filtered samples at the first rate; and generating an error signal at the first rate from the high pass filtered samples.

31. A method according to claim 28, wherein digitally compensating the closed loop power converter circuit at a first rate responsive to samples of an output of the closed loop output circuit that are digitally filtered at a second rate that is greater than the first rate comprises:

applying an infinite impulse response (IIR) filter at the second rate to the samples; and generating an error signal at the first rate from the IIR filtered samples.

32. A method according to claim 28, wherein digitally compensating the closed loop power converter circuit at a first rate responsive to samples of an output of the closed loop output circuit that are digitally filtered at a second rate that is greater than the first rate comprises digitally filtering the samples at the second rate to provide additional phase margin for the closed loop output circuit.

33. A method according to claim 28, wherein digitally compensating the closed loop power converter circuit at a first rate responsive to samples of an output of the closed loop output circuit that are digitally filtered at a second rate that is greater than the first rate comprises generating pulse width commands to the pulse width modulator from the digitally filtered samples of the AC output at the first rate.

34. A method according to claim 28, wherein the closed loop power converter circuit comprises an output circuit of a UPS.

* * * * *